Patented Dec. 19, 1950

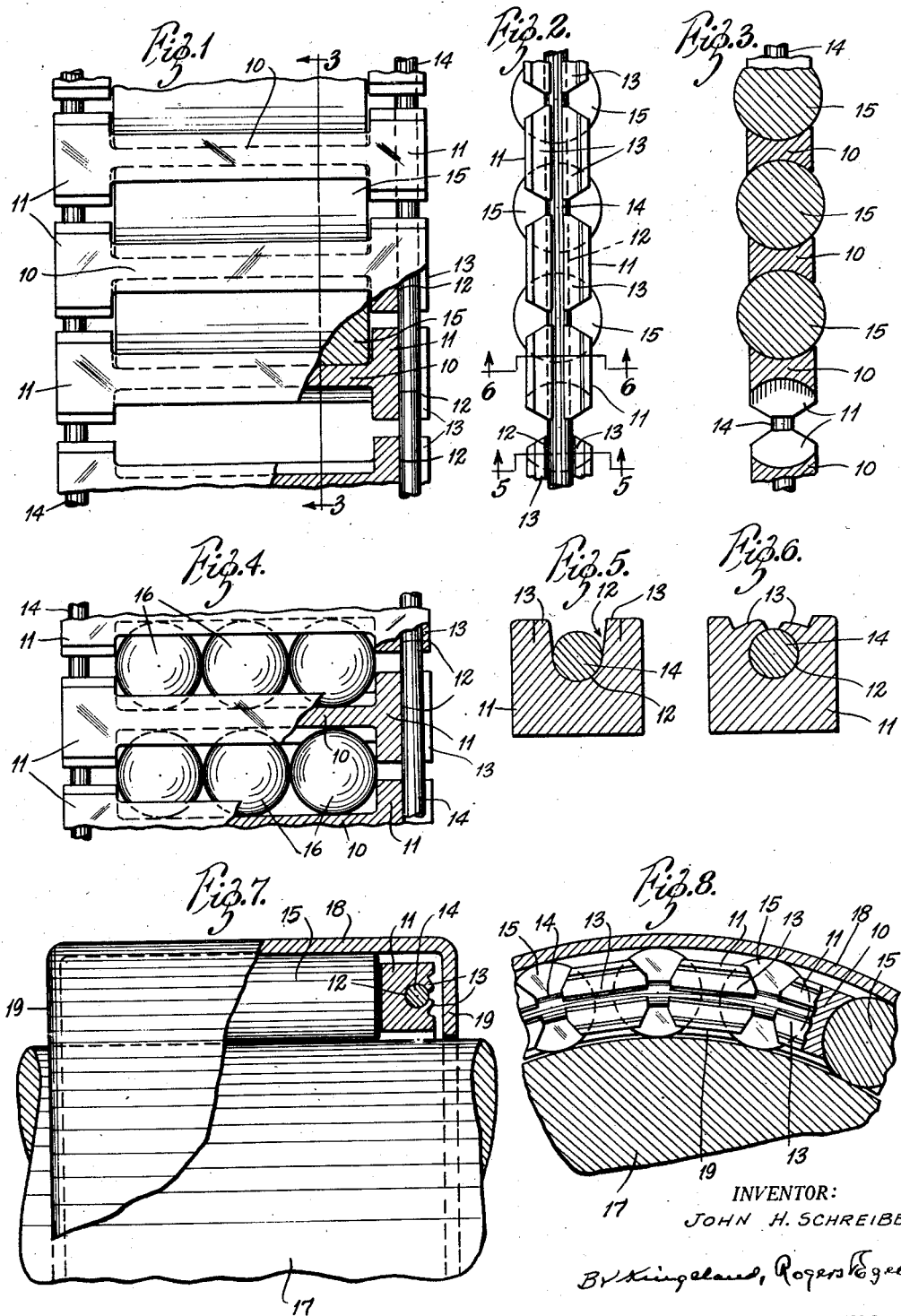

2,534,379

UNITED STATES PATENT OFFICE 2,534,379

BEARING

John H. Schreiber, St. Louis, Mo.

Application October 1, 1945, Serial No. 619,507

9 Claims. (Cl. 308—217)

This invention relates to improvements in bearings, and more particularly to a construction of bearings of the antifriction type such as roller or ball bearings.

An object of the invention is to provide a bearing structure of the antifriction type, which may be fabricated by mass production methods from uniform parts and which can be assembled with shafts of varying diameters, thus providing a construction that is adaptable for use with shafts of such varying diameters without fabricating the unit to special size.

More particularly, the invention contemplates a bearing construction of the class mentioned, which may be produced in a series of bearing units joined together to form a continuous length of the assembled parts from which unit lengths for constructing a bearing unit for shafts of varying diameters may be separated and assembled with a shaft to provide a bearing of proper dimensions for such shafts.

Another more specific object of the invention is to produce a continuous length of bearing structure, comprising parallel rows of rollers or balls revolubly supported by a series of cages formed from a series of duplicated retaining members, and arranged in a longitudinal assembly by connecting members which permit selected lengths of the continuous structure to be separated and formed in bearing units and which units, in assembling the same, may be arcuately flexed in order to be mounted for bearings of shafts having different diameters.

Additional advantages of the construction will be apparent from the following detailed description taken in connection with the accompanying drawing, in which:

Fig. 1 is a top plan view of a section of the bearing structure, a part being broken away to illustrate the manner of assembly;

Fig. 2 is an end elevation of a section of the structure illustrated in Fig. 1;

Fig. 3 is a vertical section taken substantially on the line 3—3 of Fig. 1;

Fig. 4 is a view similar to Fig. 1 of a part of the structure in which balls are inserted instead of the rollers in the retaining cages;

Fig. 5 is a cross section on a line corresponding to line 5—5 of Fig. 2 but illustrating the retaining channel for one of the connecting members before crimping of the retaining flanges;

Fig. 6 is a view similar to Fig. 5 with the retaining flanges crimped about one of the connecting members;

Fig. 7 is a view partially in elevation and partially in section, illustrating the assembly of the bearing structure with a shaft; and Fig. 8 is a vertical section at right angles to Fig. 7.

In the embodiment of the invention illustrated in the drawing, it is contemplated that the structure shall be fabricated in a continuous length comprising bearing units, consisting of a series of separating members, each of which is formed from a central vertical plate 10, having integrally formed therewith at each end a transverse arm 11. The arms provide the end walls of retaining recesses on each side of the plate 10, and, when the spacing members are assembled in parallel relationship and spaced apart, a parallel series of rectangular pockets or cages for the antifriction members is provided.

The outer face of each of the members 11 has a channel 12 formed therein and, spaced inwardly from the upper end of the channel wall, the face of said members has a shallow cut formed therein to provide short sections 13 of metal, which may be bent inwardly (Figs. 5 and 6).

The member 10—11 is of duplicated construction and is designed to be produced by mass production methods. The material employed is preferably steel which may be formed by casting, or otherwise formed, in any preferred manner. These separating members may, therefore, be very cheaply manufactured in quantities.

In order to assemble and retain the spacing member to form the cages or retaining recesses for the roller bearings or balls, said members are first assembled in parallel alignment, as best illustrated in Fig. 1, so that the adjacent walls of each of the members form the rectangular spaces defined by the recesses in the adjacent spacing members. The spacing members are spaced so that, while the ends of the members 11 will provide the end retaining walls of the cages for the antifriction members, these members may be moved to different angular adjustments in respect of each other, in order that the bearing may be mounted on and about shafts of different diameters.

The spacing members are continuously supported in this parallel relationship by a pair of connecting members 14, which are preferably formed from continuous lengths of a steel wire or rod, having a high tensile strength, but which has the characteristic of slight flexibility. The connecting members 14 are seated in the channels 12 after the member 10—11 has been properly spaced. The flanges 13 which are formed by the material at the open end of the channels 12 are then crimped inwardly against the members 14, as illustrated in Fig. 6, thereby clamping and securing the spacing members in proper adjustment.

In the one form of bearing, a roller 15 is seated in each of the spaces defined by the adjacent walls of the separating members as illustrated in Figs. 1–3, or alternatively, a series of balls 16 of proper diameter are seated in parallel rows in the spaces between the separating members, it being understood that either the rollers 15 or the balls 16 have a diameter slightly in excess of the depth of the recesses or cages in which they are mounted, and that they are freely revoluble therein.

In assembling the structure to form unit bearing members, a selected length of the continuous bearing structure is separated from the continuous length of the structure thus assembled by cutting the connecting members 14 at the proper point. The structure is then bent around a shaft indicated at 17 which, in effect, constitutes the inner race of the bearing structure.

In order to retain the bearing in assembled relation to the shaft, an outer race comprising a plate 18 formed as an annulus with side flanges 19 is provided. This outer race has a diameter in respect of the diameter of the shaft such as to space it sufficiently from the periphery of the shaft, in order that it will ride upon the rollers or balls, as the case may be, to permit said members to freely rotate, and yet to be held or retained in their cages. It will be understood that the outer race may be supported in any usual form of journal bearing, thereby providing the antifriction support for the shaft.

From the foregoing description, it will be understood that the structure disclosed may be fabricated at a very low cost and, that by separating the required lengths from the continuously formed bearing structure, units of desired length to accommodate the varying diameter of shafts may be provided and then assembled where required for the anti-friction support of shafts having a wide variation in diameter.

It will also be understood that, where it is desired to provide an antifriction support in a horizontal plane, the desired length of the bearing structure may be separated from the continuous structure, and employed for the support of a machine part having a flat instead of a rounded surface.

It will also appear that for providing the bearing units of different diameter, the only special dimensioned element is the outer race having a diameter appropriate to the shaft for which it is to constitute a part of the bearing structure.

It will be understood that the elements of the structure may be varied in form and construction without departing from the principles of the invention, and that the scope of the invention is not limited except as defined in the claims.

What I claim and desire to secure by Letters Patent is:

1. A bearing structure comprising a series of individual duplicated spacing members formed to provide when in assembled relation a series of rectangular cages for antifriction elements, revoluble antifriction members loosely mounted and retained in said cages, flexible separate connecting means secured to said spacing members to retain the same in spaced parallel relationship, said connecting means being adapted to be cut to provide bearing units of select lengths.

2. A bearing structure comprising a series of duplicated spacing members forming on each side substantially U-shaped retaining recesses, flexible connecting members secured to said spacing members at each end thereof to maintain said members in parallel spaced relationship, and revoluble antifriction members loosely mounted in the spaces between said spacing members.

3. A bearing structure comprising a series of duplicated spacing members, each comprising a central plate and a transverse arm at each end of said plate, connecting members extending axially of said arms, said spacing members being secured to said connecting members in parallel spaced adjustment, antifriction members (rollers or balls) loosely mounted between said spacing members and being freely revoluble therein.

4. A bearing structure comprising a series of individual spacing members formed to provide rectangular retaining cages assembled in parallel relationship, individual flexible connecting members extending parallel to each other and secured to the extremities of said spacing members, and antifriction members (rollers or balls) mounted in said cages, said bearing structure being adapted to be bent around a cylindrical shaft by flexing said connecting members in the spaces between said spacing member.

5. A bearing structure, comprising a series of spacing members substantially I-shaped in cross section, flexible means for connecting said spacing members in spaced relationship to provide rectangular retaining cages, antifriction members loosely mounted in said cages, said bearing being adapted to embrace a cylindrical shaft, and means for retaining said antifriction devices in said cages when assembled with a shaft.

6. A bearing structure comprising a series of duplicated spacing members, each having a central portion with bearing receiving faces and end portions, said end portions being of trough shape, antifriction bearing members between said spacing members in caged relation, and parallel flexible connecting members disposed in the troughs of said end portions and secured thereto integrating said structure.

7. A bearing structure comprising a series of duplicated spacing members, each having a central portion with bearing receiving faces and end portions, said end portions being of trough shape, antifriction bearing members between said spacing members in caged relation, and parallel flexible connecting members disposed in the troughs of said end portions, each trough shaped end portion including segments crimped against its connecting member to secure it thereto.

8. A bearing structure for ready flexing as required comprising a flexible supporting structure including spaced transverse portions and captured bearing elements supported between spaced transverse portions and maintained thereby against escape from the side faces of said supporting structure, said bearing elements being permanently retained against escape from the side faces of said supporting structure by said spaced transverse portions in any flexed position of the flexible supporting structure.

9. A bearing structure for ready flexing as required comprising a flexible supporting structure including spaced transverse portions and captured bearing elements supported thereby, said supporting structure and captured bearing elements being formed as duplicating segments, said bearing elements being permanently retained against escape from the sides of the supporting structure by said spaced transverse portions in any flexed position of the flexible supporting structure.

JOHN H. SCHREIBER.

REFERENCES CITED

The following references are of record in the file of this patent:

UNITED STATES PATENTS

| Number | Name | Date |
|---|---|---|
| 1,928,823 | Young | Oct. 3, 1933 |
| 1,931,073 | Herrmann | Oct. 17, 1933 |
| 1,962,372 | Twomley | June 12, 1934 |
| 1,966,266 | Skelly | July 10, 1934 |
| 2,038,474 | Brown | Apr. 21, 1936 |
| 2,171,854 | Lee | Sept. 5, 1939 |
| 2,247,128 | Levey | June 24, 1941 |
| 2,288,564 | Gales | June 30, 1942 |